(12) United States Patent
White

(10) Patent No.: US 11,725,298 B2
(45) Date of Patent: Aug. 15, 2023

(54) ELECTROLYTIC BRUSH ASSEMBLY

(71) Applicant: ENSITECH IP PTY LTD, Sydney (AU)

(72) Inventor: Clive White, Faulconbridge (AU)

(73) Assignee: Ensitech IP Pty Ltd, Sydney (AU)

( * ) Notice: Subject to any disclaimer, the term of this patent is extended or adjusted under 35 U.S.C. 154(b) by 128 days.

(21) Appl. No.: 16/099,758

(22) PCT Filed: May 8, 2017

(86) PCT No.: PCT/AU2017/050418
§ 371 (c)(1),
(2) Date: Nov. 8, 2018

(87) PCT Pub. No.: WO2018/006119
PCT Pub. Date: Jan. 11, 2018

(65) Prior Publication Data
US 2019/0119825 A1  Apr. 25, 2019

(30) Foreign Application Priority Data
May 11, 2016 (AU) ................................ 2016901748

(51) Int. Cl.
*C25F 1/06* (2006.01)
*A46B 7/04* (2006.01)
(Continued)

(52) U.S. Cl.
CPC .................. *C25F 1/06* (2013.01); *A46B 7/04* (2013.01); *A46B 11/06* (2013.01); *A46B 17/02* (2013.01);
(Continued)

(58) Field of Classification Search
None
See application file for complete search history.

(56) References Cited

U.S. PATENT DOCUMENTS

| 3,466,239 | A | * | 9/1969 | Kerschgens | ........... | C25D 17/14 |
| | | | | | | 204/224 R |
| 4,159,934 | A | * | 7/1979 | Kadija | ................... | C25D 17/14 |
| | | | | | | 204/224 R |

(Continued)

FOREIGN PATENT DOCUMENTS

| CN | 2922583 | | 7/2007 | | |
| CN | 103882507 | * | 8/2014 | ................ | C25F 7/00 |

(Continued)

*Primary Examiner* — Stefanie S Wittenberg
(74) *Attorney, Agent, or Firm* — Skinner and Associates; Joel Skinner

(57) ABSTRACT

Disclosed herein is an electrolytic brush assembly comprising a handle assembly; a shroud extending from the handle assembly, the shroud having an aperture at a distal end thereof; a brush connecting assembly for releasably connecting a brush to the handle assembly whereby the brush extends through the aperture of the shroud and a fluid delivery assembly. The handle assembly comprises an adjustment sub-assembly for selectively moving the brush connecting assembly and a brush connected thereto relative to the handle assembly and the aperture of the shroud. The fluid delivery assembly delivers electrolytic fluid to the proximity of the brush, optionally under closed loop control.

21 Claims, 6 Drawing Sheets

(51) Int. Cl.
    *A46B 11/06*     (2006.01)
    *A46B 17/02*     (2006.01)
    *A46B 17/04*     (2006.01)
    *B08B 3/10*     (2006.01)
    *B08B 1/00*     (2006.01)
    *C25F 7/00*     (2006.01)
    *B23K 37/00*     (2006.01)
    *B23K 37/08*     (2006.01)
    *C25F 1/00*     (2006.01)

(52) U.S. Cl.
    CPC .............. *A46B 17/04* (2013.01); *B08B 1/002* (2013.01); *B08B 3/10* (2013.01); *B23K 37/00* (2013.01); *B23K 37/08* (2013.01); *C25F 1/00* (2013.01); *C25F 7/00* (2013.01)

(56) References Cited

U.S. PATENT DOCUMENTS 4,321,219 A * 3/1982 Barker .................... A47L 11/34
                                                                   137/142
5,401,369 A * 3/1995 Gershin ................ C25D 17/14
                                                                   204/224 R
5,964,990 A * 10/1999 Muratori .................... C25F 7/00
                                                                   204/224 M
2004/0136773 A1     7/2004 Costello
2010/0276301 A1* 11/2010 Field .................... A47L 11/4083
                                                                   204/224 R

FOREIGN PATENT DOCUMENTS

| DE | 19844832 | * | 4/2000 | ................ C25F 7/00 |
|---|---|---|---|---|
| GB | 2220989 | | 3/1989 | |
| KR | 100414805 | * | 1/2004 | ................ C25F 3/16 |
| KR | 200423582 | * | 8/2006 | ................ C25F 3/30 |
| WO | 2004/087333 | | 10/2004 | |
| WO | WO 2005/089968 A1 | | 9/2005 | |
| WO | WO 2018/181715 A1 | | 12/2013 | |
| WO | WO-2013181715 A1 | * | 12/2013 | ......... A46B 15/0022 |
| WO | WO 2015/172194 A1 | | 11/2015 | |
| WO | WO 2016/019460 A1 | | 2/2016 | |

* cited by examiner

ELECTROLYTIC BRUSH ASSEMBLY

TECHNICAL FIELD

The present invention relates generally to electrolytic cleaning of metals, and more particularly to a conductive brush assembly used in electrolytic cleaning of metal welds.

BACKGROUND TO THE INVENTION

During the process of welding a metal, it is common for the metal to become discoloured by the welding process. For example, when welding stainless steel, the chromium content of the metal is depleted, exposing iron and causing a localised discolouration of the stainless steel, known as "heat tint". In other applications, oxides form during the welding process, leaving unattractive deposits on the surface of the metal, or otherwise discolouring the metal.

It is common practice that after a metal has been welded, the discoloured surfaces are cleaned to remove or reduce the heat tint. In the past, this has typically been performed by a variety of methods, such as using an abrasive, bead blasting or exposing the discoloured region to strong acids.

More recently, cleaning of welded joints has been performed using an electrically charged pad or brush applicator having conductive filaments, in conjunction with an electrolyte, to clean a metal surface by applying a concurrent chemical reaction, heat and electric current. The simultaneous electrolytic and high temperature cleaning action has proven successful in efficient cleaning of welded metals, particularly in cleaning stainless steel. Known electrically charged brushes having conductive filaments can, however, suffer from a number of drawbacks. For example, known brushes can perform poorly because their relatively long filaments tend to flop on their sides, particularly when wet with electrolyte, rather than presenting erect filament ends as the working contact point. Applying the electrolyte to a weld with the filaments can therefore be somewhat haphazard, which is problematic because the electrolyte is typically highly acidic and spillage likely to cause damage.

The conductive brush for cleaning welded stainless steel disclosed in international PCT publication WO 2010/085849 was developed to address such a drawback. The brush disclosed in this patent application has a body connected to a fixed length of conductive brush filaments and a sheath arranged around the filaments. The sheath has an aperture through which the filaments extend having a profile of a particular geometry to shape the filaments retained within the sheath. The sheath is also movable with respect to the body and filaments, the movement adjusting the portion of brush filaments that protrude from the aperture, thereby adjusting the effective length and stiffness of the filaments.

Whilst the brush disclosed in WO 2010/085849 has various advantages over earlier brushes (e.g. as noted above), it also has a number of drawbacks. For example, the position of the sheath with respect to the filaments or body is freely adjustable and is unable to be locked. During use, this requires a user to manually maintain the position of the sheath or else the sheath may move from the desired position (e.g. when accidentally knocked whilst cleaning a weld, as can often happen), thereby adjusting the effective length and stiffness of the filaments. Such a requirement typically necessitates a two handed operation which, in addition to the cleaning manipulations, can make the brush very unergonomic to handle.

Additionally, known prior art brush systems and pad systems lack effective automatic control of the delivery of electrolytic fluid to the applicator. Such lack of control can result in the opposite extremes of fluid delivery; either excess fluid which creates a messy and dangerous work environment with high fluid costs, or a paucity of fluid which creates surface burning, decreased cleaning effectiveness and premature failure. Currently, the operator must "guess" the amount of electrolytic fluid to supply to the applicator, either via manual dipping or by setting a fluid delivery control that is effectively "open loop."

The only proposed method of automatic fluid supply known to the inventors in the prior art is that claimed in U.S. Pat. No. 8,813,301 B2 "Conductive Brush for cleaning metals." This method relies on the obvious practice of supplying fluid to a brush head via the interstices formed between the brush fibres where they are clamped into a bundle. Experiments performed by the inventors have shown this method to commonly result in the unwanted and uncontrolled restriction of fluid flow due to both the variability in clamping force on the fibres and the rapid build up of clogging material in the narrow interstices, A need exists for a conductive brush assembly which overcomes, or at least ameliorates, one or more of the disadvantages of the prior art arrangements.

SUMMARY OF THE INVENTION

According to a first aspect of the invention, there is provided an electrolytic brush assembly comprising:

a handle assembly;

a shroud extending from the handle assembly, the shroud having an aperture at a distal end thereof; and a brush connecting assembly for releasably connecting a brush to the handle assembly whereby the brush extends through the aperture of the shroud, wherein the handle assembly comprises an adjustment sub-assembly for selectively moving the brush connecting assembly and a brush connected thereto relative to the handle assembly and the aperture of the shroud.

According to a second aspect of the invention, there is provided an electrolytic brush assembly comprising:

a handle assembly;

a shroud extending from the handle assembly, the shroud having an aperture at a distal end thereof; and a brush releasably connected to the handle assembly and extending through the aperture of the shroud, wherein the handle assembly comprises an adjustment sub-assembly for selectively moving the brush relative to the handle assembly and the aperture of the shroud.

According to a third aspect of the invention there is provided a fluid control and delivery assembly in communication with the brush for the supply of electrolytic fluid to the brush comprising:

an input connection for the reception of electrolytic fluid from a store or reservoir;

a tube or other means of delivering said fluid to the brush fibres;

a pump or other transfer means for driving said fluid into the proximity of the brush fibres; and a fluid control means for regulating the flow through said pump or other transfer means wherein the magnitude of the flow is determined by the reception from sensing means of parameter values which may vary with the quantity of electrolytic fluid present in the brush;

Embodiments of the second and third aspects of the invention may be the same as the embodiments of the first aspect of the invention, as described herein.

Other aspects are also disclosed.

BRIEF DESCRIPTION OF THE DRAWINGS

Preferred embodiments of the present invention will now be described, by way of example only, with reference to the accompanying drawings in which.

DETAILED DESCRIPTION OF PREFERRED EMBODIMENTS

Figure 1:
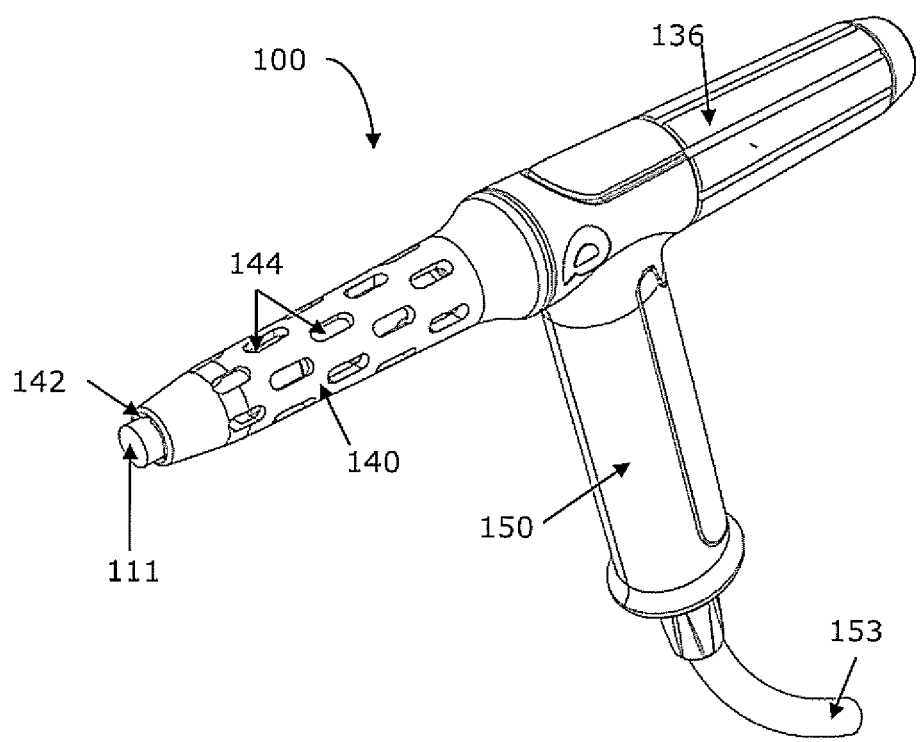
FIG. 1 is a perspective view of an electrolytic brush assembly in accordance with an embodiment of the present invention.

As noted above, the present invention relates to an electrolytic brush assembly. In its first aspect, the electrolytic brush assembly comprises a handle assembly; a shroud extending from the handle assembly, the shroud having an aperture at a distal end thereof; a brush connecting assembly for releasably connecting a brush to the handle assembly such that the brush extends through the aperture of the shroud; an electrolytic fluid delivery conduit, communicating between an external fluid reservoir (not shown) and the brush; and a fluid control means that regulates and delivers the flow of said fluid to the brush. The handle assembly comprises an adjustment sub-assembly for selectively moving the brush connecting assembly and a brush connected thereto relative to the handle assembly and the aperture of the shroud.

In its second aspect, the electrolytic brush assembly comprises a handle assembly; a shroud extending from the handle assembly, the shroud having an aperture at a distal end thereof; a brush releasably connected to the handle assembly and extending through the aperture of the shroud; and an electrolytic fluid delivery conduit, communicating between an external fluid reservoir (not shown) and the brush; and a fluid control means that regulates the flow of said fluid to the brush. The handle assembly comprises an adjustment sub-assembly for selectively moving the brush relative to the handle assembly and the aperture of the shroud.

The electrolytic brush assemblies of the present invention advantageously use a brush which is both releasably connectable to the assembly and selectively moveable in order to control the amount of the brush which extends through the shroud's aperture. Providing an electrolytic brush assembly in which the brush is replaceable is advantageous because brushes tend to wear out with use and, in many prior art electrically charged brushes, the brushes are either not replaceable, or are replaceable but necessitate that the electrically charged brushes be switched off and cleaned to remove any caustic electrolytic cleaning chemicals beforehand.

Providing an electrolytic brush assembly in which the brush is selectively moveable in order to control the amount of the brush which extends through the shroud's aperture is advantageous because the brush may be moved (relative to the handle assembly and aperture of the shroud) such that the proportion of the brush's filaments extending through the shroud's aperture can be selectively adjusted (e.g. by a user or automatically) based on factors such as wear on the brush and the relative stiffness of the brush's exposed filaments. Furthermore, accidentally striking the shroud during use of the electrolytic brush assembly will not cause it to move and thus affect the shape of the brush. As noted above, this can be a problem of existing conductive brushes.

Actuating the adjustment sub-assembly need not be a two-handed operation and may, in some embodiments, be conducted whilst the electronic brush assembly is in use. The adjustment sub-assembly may, in some embodiments, be quickly and easily actuated in order to fine tune the performance of the brush in response to a particular application (e.g. the brush can be extended if a weld requiring cleaning is in a hard to reach position). Further, when performing such adjustments it is not necessary for a user to touch (or risk inadvertently touching) the hot and caustic brush filaments.

The electrolytic brush assemblies of the present invention comprise a handle assembly. The handle assembly may have any form, as long as it can be held in the hand of an operator (preferably one hand only) and provide the functions recited herein.

The electrolytic brush assembly of the present invention may be more ergonomic to use than existing electrically charged brushes. Many existing electrically charged brushes are similar to paint brushes, were the user's wrist needs to be bent in order to clean the welds. Typically, the electrolytic brush assembly of the present invention will be ergonomically designed for ease of operation by a user and to lessen the risk of injury by overuse. In some embodiments, the handle assembly may therefore include grips such as a pistol grip handle, for example, which can help to make the assembly easier for the user to operate. The electrolytic brush assembly of the present invention may, for example, be provided in the form of a T-shape, with the brush and the handle being at right angles to each other, such that a user's wrist is substantially in line with their arm when operating the brush.

Furthermore, in some embodiments of the present invention (some of which are described in further detail below), it may be necessary for conduits to pass through the electrolytic brush assembly (e.g. to carry in electrolytic cleaning fluid or carry out potentially toxic fumes). In such embodiments, running these tubes through a pistol grip handle (or other grippable handle) would provide a more suitable weight balance in the brush, again making it more ergonomic for the user.

The handle assembly comprises an adjustment sub-assembly for selectively moving the brush connecting assembly and/or brush relative to the handle assembly and the aperture of the shroud.

The adjustment sub-assembly may include any suitable components, provided that they are operable to selectively move the brush in the manner described herein. In some embodiments, for example, the adjustment sub-assembly comprises a sheath; a rod slidably received within the sheath, the rod being connected to the brush connecting assembly; and an actuator for moving the rod within the sheath. Actuating the rod causes the brush connecting assembly and/or brush to move relative to the handle assembly and the aperture of the shroud.

The actuator in the adjustment sub-assembly may include any suitable components, provided again that they achieve the function described herein. In some embodiments, for example, the actuator comprises a rotatable sleeve having an inner thread functionally connected to the rod. Rotation of the rotatable sleeve causes linear movement of the rod within the sheath. As noted above, such linear movement causes the brush connecting assembly and/or brush to move relative to the handle assembly and the aperture of the shroud.

The actuator may be actuated either manually (e.g. by a user rotating the sleeve when they want to expose more of the brush's filaments to provide extra reach or a softer tip, or retract the brush to provide a firmer tip) or automatically (e.g. in response to the length of the exposed brush falling below a predetermined amount).

The electrolytic brush assembly of the present invention also comprises a shroud extending from the handle assembly. The shroud has an aperture at a distal end thereof, through which the end of any brush releasably connected to the handle assembly, such that it can be applied to a welded surface in order to clean the weld.

The shroud may have any form, provided that it is suitable for use with the electrolytic brush assembly described herein. Typically, the shroud will be shaped such that it can comfortably house the brush and any other components of the assembly intended to be received therein. The shroud may contain openings such that any fumes etc. that may form and heat generated by the electrical connections can dissipate into the environment. Alternatively, the shroud may contain no openings (i.e. except the aperture), such that fumes can be extracted and remotely disposed (as described below) and/or cleaning fluids can be pumped into the shroud and hence on to the brush filaments (as described below).

The aperture of the shroud (i.e. through which the brush extends) may have any suitable shape. As will be appreciated, the shape of the shroud's aperture will affect the pattern which the brush filaments make. Typically, the aperture will be circular or rectangular, although other shapes may be advantageous ib some circumstances.

Typically, the shroud is fixed with respect to the handle assembly so that it cannot be moved, even in the event of it being struck during operation of the electrolytic brush assembly. Typically, the shroud encloses a volume surrounding the non-exposed portion of the brush, with conditions within the volume being monitorable (as discussed below) in order to better control the operation of the electrolytic brush assembly.

In some embodiments, for example, a volume defined by the shroud may be fluidly connected to conduits (e.g. in the handle assembly), wherein the conduits are fluidly connectable to an external extraction pump, thereby allowing fumes created within the volume to be extracted during operation.

In some embodiments, for example, the fluid delivery means may be contained in or associated with the shroud thereby allowing electrolytic cleaning fluid to be continuously delivered (as needed) to the filaments of the brush via the fluid control means. Such a continuous delivery of cleaning fluid represents a significant improvement over existing electrically charged brushes, which require the brush to be regularly dipped into a container of the cleaning fluid. The fluid may be continuously delivered via these conduits, or delivered only upon demand by the user (e.g. by squeezing a trigger on the pistol grip handle).

In the electrolytic brush assembly of the present invention, the brush is either releasably connectable to the handle assembly via a brush connecting assembly, or is provided releasably connected to the handle assembly. As noted above, releasably connecting the brush to the assembly enables the brush to be easily replaced at the end of its useful life.

The brush may be releasably connectable to the brush connecting assembly by any suitable mechanism. Typically, the brush is releasably connectable to the brush connecting assembly by a quick release mechanism, which enables a spent brush to be quickly and easily disconnected and a new brush to be quickly and easily connected. Typically, such disconnection would not necessitate a user handling the brush, as it will likely be hot and/or contaminated with potentially corrosive chemicals such as acids.

In some embodiments, for example, the quick release mechanism may comprise a female quick-connect coupler for receiving an end of the brush, the female quick-connect coupler comprising an outer sleeve slidable relative to an inner body, the outer sleeve being biased in a direction in which the brush is gripped within the female quick-connect coupler, the female quick-connect coupler releasing the brush when the outer sleeve is urged in an opposite direction.

In some embodiments, for example, the shroud may comprise an obstruction, the obstruction being arranged to contact the outer sleeve of the female quick-connect coupler upon the brush connecting assembly being moved towards the aperture of the shroud thereby urging the outer sleeve in the opposite direction and releasing the brush from the female quick-connect coupler. As such, a brush would be automatically ejected once spent by simply continuing to actuate the adjustment sub-assembly.

In some embodiments, the electrolytic brush assembly of the present invention may have additional features in order to provide additional functionality and advantages to those discussed above. For example, in some embodiments, the assembly may further comprise at least one sensor. The at least one sensor may be adapted to sense any one or more parameters relevant to the operation of the electrolytic brush assembly. For example, the at least one sensor may sense a temperature of a brush connected to the connecting assembly, an extent to which a brush connected to the connecting assembly extends through the aperture of the shroud, and/or an amount of fumes contained in a volume defined by the shroud.

In embodiments of the present invention having such sensors, the assembly may further comprise means for adapting the assembly in response to the sensed conditions.

For example, in embodiments where the electrolytic brush assembly of the present invention comprises at least one sensor for sensing an extent the brush extends through the aperture of the shroud, the assembly may, for example, further comprise a driver for driving the actuator; and a brush drive controller for controlling the drive means based upon input from the at least one sensor.

For example, in embodiments where the electrolytic brush assembly of the present invention comprises a sensor for sensing a temperature of a brush connected to the connecting assembly (the temperature of which is dependent on the wetness of the brush, which may not be visually observable by the user), the assembly may, for example, further comprise a reservoir of cleaning fluid, a pump and conduits adapted to deliver the cleaning fluid to the brush.

For example, in embodiments where the electrolytic brush assembly of the present invention comprises a sensor for sensing an amount of fumes contained in a volume defined by the shroud, the assembly may, for example, further comprise conduit(s) and an extraction pump for extracting the fumes and disposing of them safely.

In some embodiments, the rate of delivery of electrolytic fluid to the brush may be controlled in a closed loop manner such that the amount of fluid in the brush is maintained at or near the optimum level. This may be effected by varying the drive to the fluid pump or other fluid transfer means in a manner that keeps a calculation derived from the magnitude of the signals received from sensing means at a constant level. Such sensing means may, variously, include a temperature sensor located in proximity to the brush, a signal proportional to the current passing through the brush and a signal proportional to the voltage measured across the brush. An additional sensing means may also measure the instantaneous speed or volume flow of the fluid pump.

Specific embodiments of the present invention will now be described below, by way of example only, with reference to the accompanying drawings. Where reference is made in any one or more of the accompanying drawings to features which have the same reference numerals, those features have for the purposes of this description the same function(s) or operation(s), unless the contrary intention appears.

Figure 2:
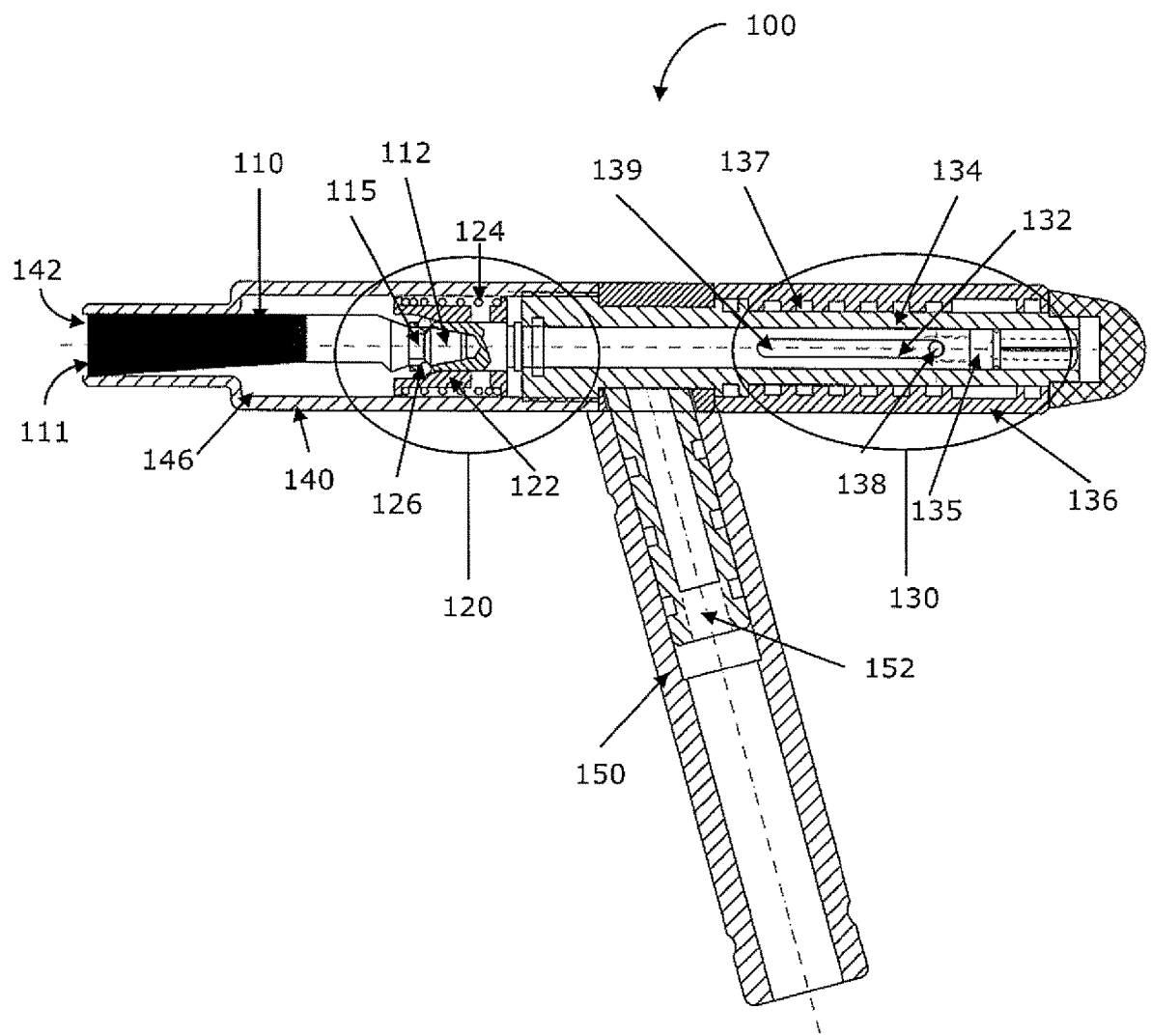
FIG. 2 is a cut-away side view of the brush assembly shown in FIG. 1.
Figure 3:
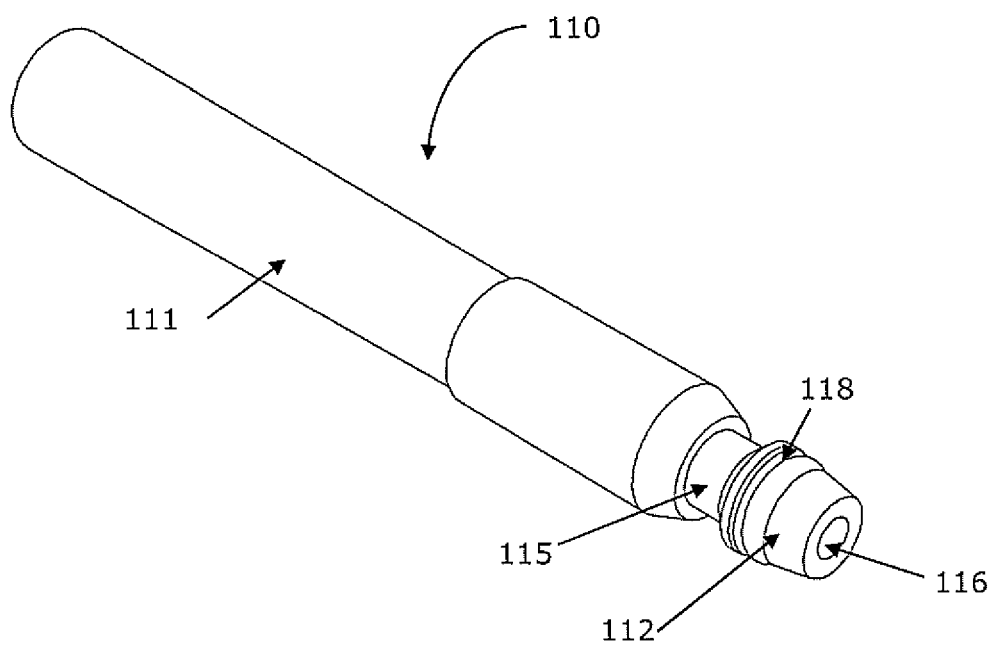
FIG. 3 is a detailed view of the brush of the brush assembly shown in FIGS. 1 and 2.

FIG. 1 is a perspective view of an electrolytic brush assembly 100 in accordance with an embodiment of the present invention. FIG. 2 is a cut-away side view of the brush assembly 100 shown in FIG. 1. FIG. 3 is a detailed view of the brush 110 of the brush assembly 100 shown in FIGS. 1 and 2.

The brush assembly 100 is used for cleaning metals. More particularly, the brush assembly has a brush 110 having conductive filaments 111 which are electrically charged. The brush assembly 100 is used in conjunction with an electrolyte (not illustrated) to clean a metal surface by applying a concurrent chemical reaction, heat and electric current.

The brush assembly 100 has a handle assembly 150 for gripping an end 112 of the brush 110 and conduct electrical current to the filaments 111 of the brush 110.

The handle assembly has a pistol grip handle 150. A distal end of the handle 150 is equipped with an electrical connection 152 for receiving an electrical cable 153. The inside of the handle 150 is electrically conductive for contacting electrical current to the remainder of the brush assembly 100 as appropriate, while the outside surface of the handle is insulated, allowing the brush assembly 100 to be handled.

The handle assembly also has a brush connecting assembly in the form of a gripping sub-assembly 120 for griping the end 112 of the brush 110. The operation of the gripping sub-assembly 120 is described in detail below.

The handle assembly further has a shroud 140 from which the filaments 111 of the brush 110 extends. The shroud 140 has an aperture 142 which controls the shape of the filaments 111 extending therefrom and prevents the filaments 111 from splaying out during use. The shroud 140 also has venting holes 144 along the length thereof. The venting holes 144 allow hot fluid and steam to exit the shroud 140 during operation. The shroud 140 is fixed relative to the non-moving parts of the handle assembly. Accordingly, the aperture 142 has a fixed position relative to the non-moving parts, and more particularly, relative to the pistol grip handle 150.

Referring to FIG. 2, the handle assembly further has an adjustment sub-assembly 130 for selectively moving the gripping sub-assembly 120, and thus the brush 110 gripped therein, towards and away from the aperture 142 of the shroud 140. Operation of the adjustment sub-assembly 130 thus controls the effective length of the filaments 111 extending from the aperture 142 of the shroud 140. Also, the adjustment sub-assembly 130 may be used to replenish the effective length of the filaments 111 extending from the aperture 142 as the distal ends of the filaments 111 are depleted with use.

The adjustment sub-assembly 130 includes an inner rod 132 slidably received within a sheath 134. The sheath 134 is also fixed relative to the non-moving parts of the handle assembly, and is electrically connected to the conductive parts of the handle 150. The sheath 134 is further electrically connected to the rod 132 through a sliding contact 135. Thus, electrical current is able to flow from the handle 150, through the sheath 134, to the rod 132 via the sliding contact 135, to the gripping sub-assembly 120 and finally to the brush 110, and more particularly to the filaments 111 of the brush 110.

The rod 132 has a pin 138 extending therefrom, through a slot 139 provided in the sheath 134. The slot 139 prevents the rod 132 from rotating within the sheath 134, thereby restricting the movement of the rod 132 relative to the sheath to linear movement only. The rod 132 is mechanically and electrically connected to the gripping sub-assembly 120.

The adjustment sub-assembly 130 further includes a rotatable sleeve 136 rotatable relative to the non-moving parts of the handle assembly. The rotatable sleeve 136 is insulated with respect to the voltage of the sheath 134 and typically rotated by hand. The rotatable sleeve 136 has a screw thread 137 on the inner surface thereof. The thread 137 engages the pin 138 of the rod 132. When the rotatable sleeve 136 rotates, the helical structure of the thread 137 converts the rotation of the rotatable sleeve 136 into linear movement of the rod 132 relative to the sheath 134. Dependent upon the direction of the rotation of the rotatable sleeve 136, the rod 132 and the connected brush 110 are moved towards or away from the aperture 142 of the shroud 140.

Having described the operation of the adjustment sub-assembly 130, the operation of the gripping sub-assembly 120 is now described in detail. The gripping sub-assembly 120 consists mainly of a female quick-connect coupler for receiving the end 112 of the brush 110. The female quick-connect coupler includes an outer sleeve 122 slidable relative to the inner body of the coupler. The sleeve 122 is biased towards the receiving end of the coupler by a spring 124. The inner body of the coupler includes balls 126. The balls 126 are urged towards a centre axis of the coupler when the sleeve 122 is in the rest position towards the receiving end of the coupler. While the sleeve 122 is slid against the bias of the spring 124, the balls 126 are free to move away from the axis of the coupler.

Referring also to FIG. 3, the brush 110 has a recess 115 which, when the brush 110 is received in the coupler, the balls 126 move into, and are retained in, the recess 115 when the sleeve 122 is slid by the spring 124 towards the receiving end of the coupler, thereby locking the brush 110 in place.

Referring to FIG. 2, the shroud 140 includes an obstruction in the form of a ridge 146. When the adjustment sub-assembly 130 is used to move the gripping sub-assembly 120 towards the aperture 142 of the shroud 140, at some point the sleeve 122 of the coupler of the gripping sub-assembly 120 contacts the ridge 146 of the shroud 140. Movement of the gripping sub-assembly 120 beyond this point towards the aperture 142 causes the ridge 146 to urge against the sleeve 122, sliding the sleeve 122 away from the receiving end of the coupler and against the bias of the spring 122, thus releasing the balls 126. With the balls 126 released, the balls 126 are no longer forced into the recess 115 of the brush 110, and the brush 110 is released from the gripping sub-assembly 120.

After removal of the brush 110, a replacement brush 110 may be fitted, after which the adjustment sub-assembly 130 is used to move the gripping sub-assembly 120 away from the aperture 142 of the shroud 140, and thus away from the ridge 146 of the shroud 140. The bias of the spring 124 causes the sleeve 122 to slide towards the receiving end of the coupler, thus forcing the balls 126 into the recess 115 of the replacement brush 110, thereby locking the replacement brush 110 in place.

The end 112 of the brush 110 has a conical frustum shape, and the gripping sub-assembly 120 has a complementary shape, thereby ensuring effective electrical contact between the gripping sub-assembly 120 and the brush 110.

The end 112 of the brush 110 also has an entrance 116 to a passage (not illustrated) extending through the brush 110 towards the filaments 111. The end 112 also has an "o"-ring 118 which seals with the gripping sub-assembly 120 when the brush is gripped therein.

The shroud 140 may be fluidly connected through conduits (not illustrated) in the handle assembly to an external extraction pump, allowing fumes created during operation to be extracted.

The electrolytic brush assembly 100 described herein is particularly suitable for use in an automatic electrolytic cleaning application. The electrolytic brush assembly 100 may be further provided with sensors (not illustrated) for sensing the length of the filaments 111 protruding from the aperture 142 of the shroud 140. An electric stepper motor (not illustrated) is also provided for rotating the outer sleeve 136 to thereby further extend the filaments 111 through the aperture 142. A controller (not illustrated) may control the electric stepper motor based upon input from the sensor i.e. the length of the filaments 111 protruding from the aperture 142.

Figure 6:
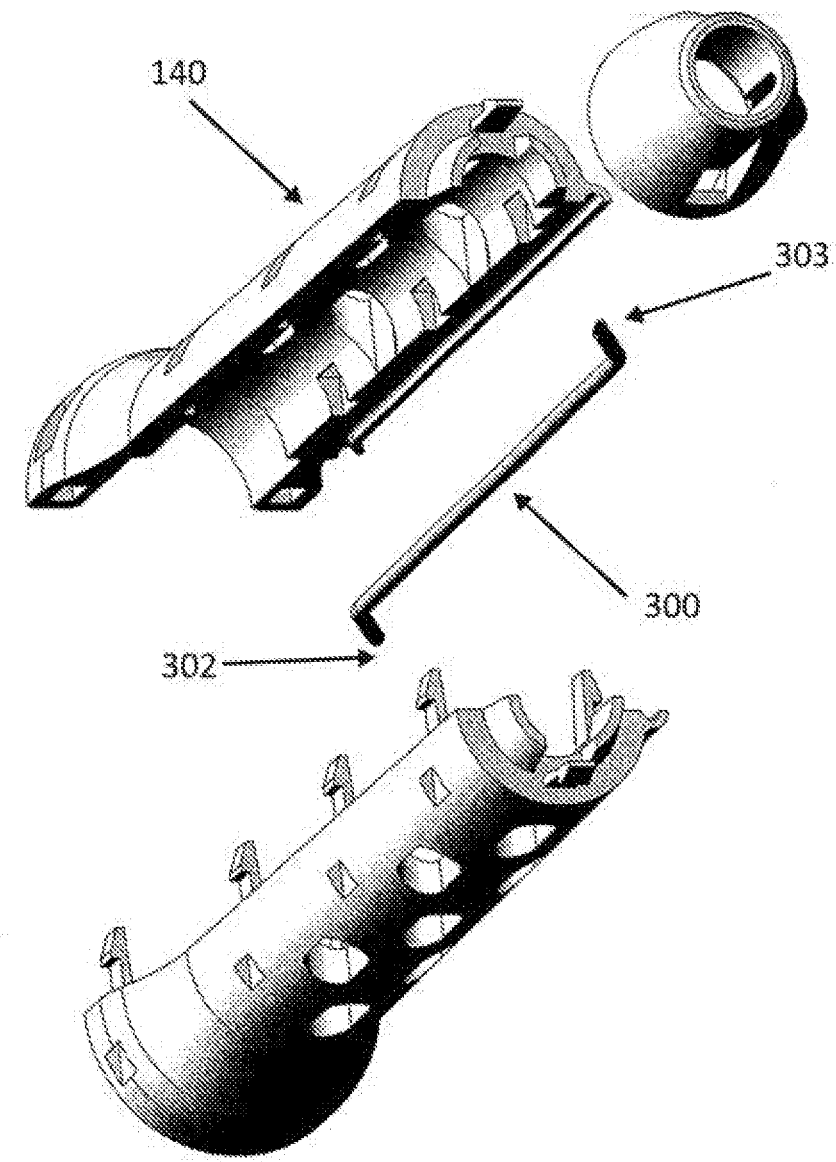
FIG. 6 is an exploded view of the shroud assembly, illustrating an embodiment of the associated electrolytic fluid delivery conduit.
Figure 7:
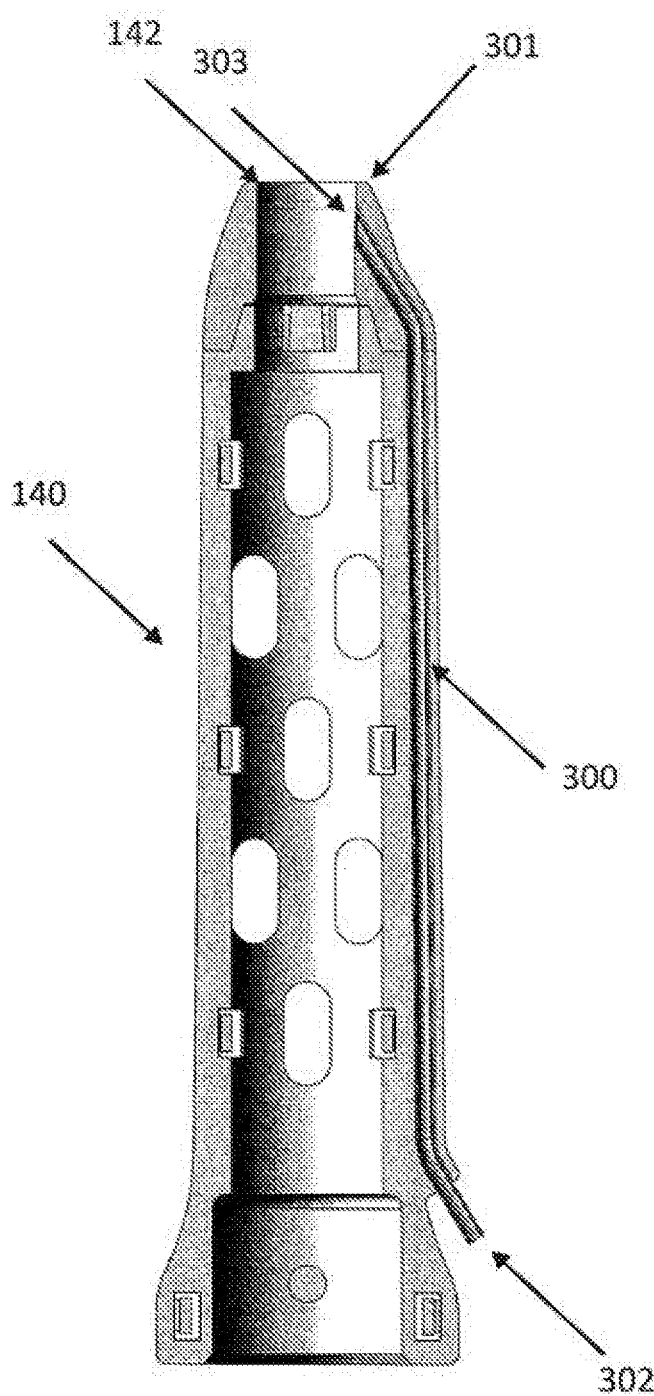
FIG. 7 is a cross sectional view of the shroud assembly, illustrating an embodiment of an integral electrolytic fluid delivery conduit.

Referring to FIGS. 6 and 7, electrolytic fluid may be supplied to the brush through the distal end 303 of fluid delivery tube (300) under the closed loop control of a fluid pump (not shown). The rate of fluid delivery is a function of input signals from, typically, sources comprising, a temperature sensing infra-red photo diode (301) located in proximity with the brush (not shown), a voltage level proportional to the current measured passing through the brush (not shown) and a voltage level proportional to the voltage drop across the brush (not shown) via conduit entry 302. Typically, the calculation used to relate the input signals to the fluid pump drive act to maintain the temperature of the brush between two set limits, typically 120 and 300 deg C., and to maintain the power dissipated in the brush between two set limits, typically 250 and 800 W. In this embodiment the power would be calculated as the product of the current passing through the brush and the voltage across the brush.

Additionally, the fluid control means described above may also incorporate a function that reverses the fluid pump on switch off. In conjunction with an anti syphon mechanism attached to the fluid reservoir this ensures that fluid does not leak out when the system is inactive. On switch on, the functionality is reversed whereby the fluid delivery tube is automatically primed with fluid for instant delivery.

Figure 4:
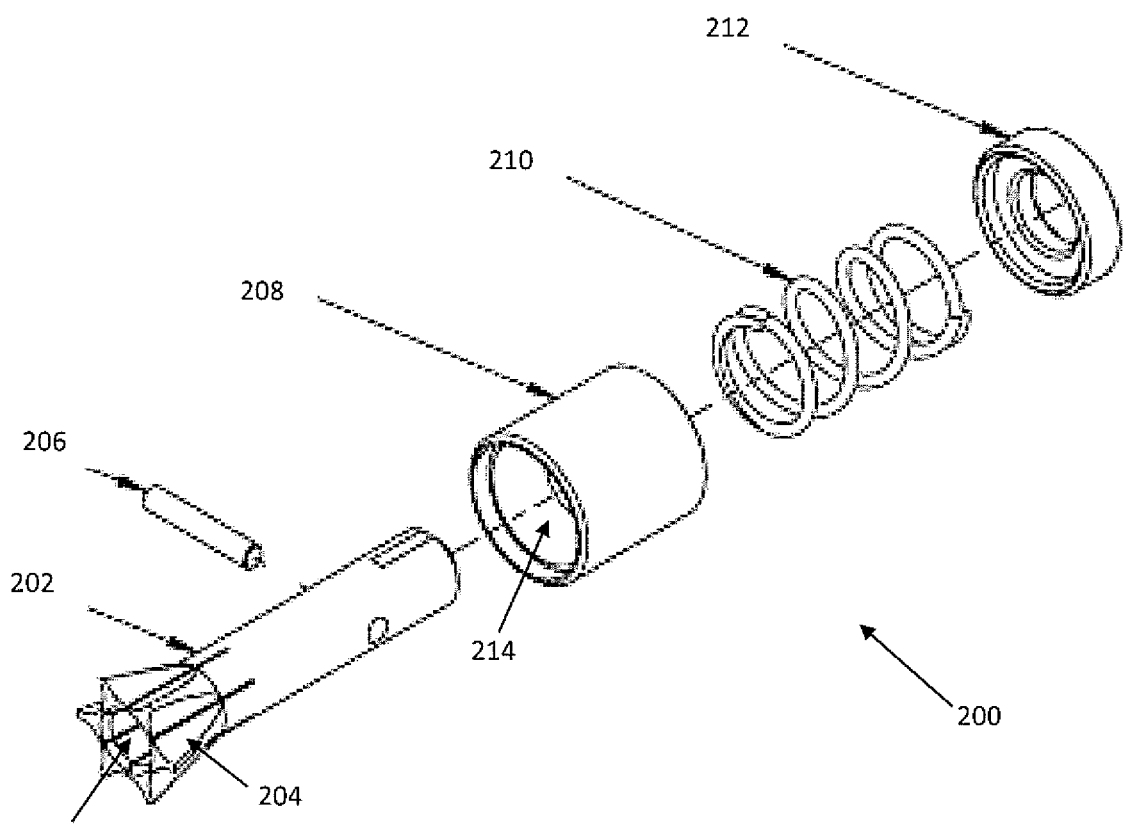
FIG. 4 is an exploded view of an alternative embodiment of a brush connecting assembly in accordance with an embodiment of the present invention.
Figure 5:
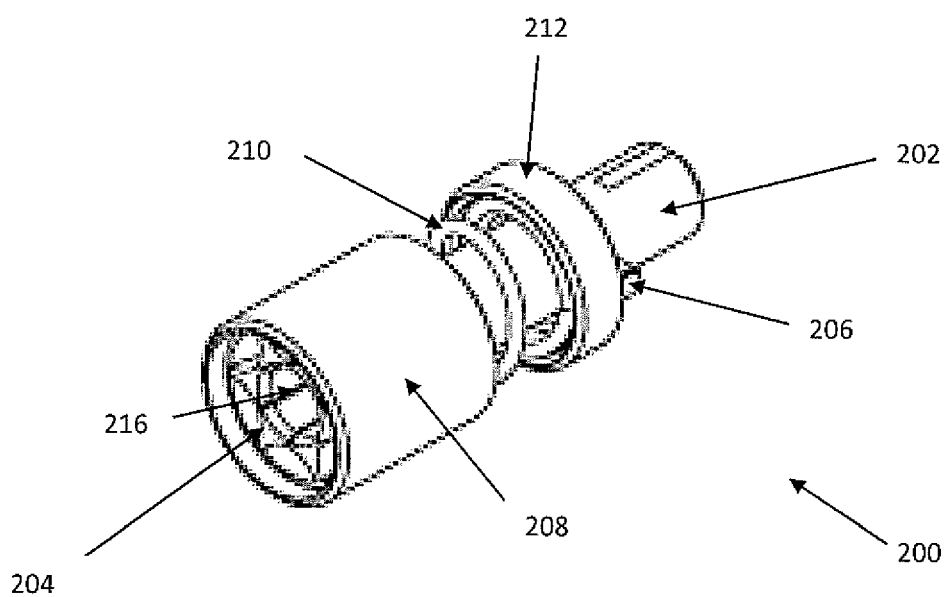
FIG. 5 is a view of the brush connecting assembly of FIG. 4 in an assembled state.

Referring now to FIGS. 4 and 5, an alternative form of a brush connecting assembly in the form of gripping sub-assembly 200 is shown. Gripping sub-assembly 200 is adapted to be received within a shroud (e.g. shroud 140) and attached to the handle assembly (e.g. rod 132) of an electrolytic brush assembly (e.g. electrolytic brush assembly 100). As described below, gripping sub-assembly 200 is particularly adapted to grip a cylindrically shaped brush (not shown), but would also be capable of gripping tapered brushes such as bush 110 (albeit less securely).

Gripping sub-assembly 200 includes a hollow tube 202 having a number of deformable portions with tapered ridges shown generally at 204, a pin 206, a cylindrical sleeve 208, a spring 210 and an end cap 212. As can be seen in FIG. 5, during assembly, the sleeve 208 is slid over the hollow tube 202 until it abuts the ridges of deformable portions 204, where it is prevented from travelling any further. Spring 210 is then slid over the hollow tube 202 and inside of the sleeve 208, until it abuts flange 214 inside of the sleeve 208. End cap 212 is then slid over the hollow tube 202 until the opposite end of the spring is contained therein. End cap 212 can be moved towards sleeve 208 simply by compressing the spring 210. Once assembled, the pin 206 is passed through hollow tube 202 in the manner shown in FIG. 5 so that all of the components are retained on the hollow tube.

In use, forcing the sleeve 208 towards the end cap 212 (i.e. against the bias of spring 210) moves the sleeve off the ridges of deformable portions 204. Deformable portions 204 are therefore able to be spread apart slightly, for example in order to receive an appropriately shaped cylindrical portion of a brush (not shown). Inserting the brush into the open end 216 of the hollow tube 202 can be achieved whilst the sleeve 208 has been forced towards the end cap 212. However, once such a force is released, the bias of the spring 210 pushes the sleeve 208 back onto the ridges of deformable portions 204 such that deformable portions 204 are compressed together and thus securely retain the brush therebetween.

Hollow tube 202 is formed from an electrically conducting material such that, once retained therein, a current supplied to the hollow tube 202 (e.g. via the rod 132, as discussed above) is passed into the bush (not shown) and its filaments.

Operation of the gripping sub-assembly 200 in an electrolytic brush assembly such as electrolytic brush assembly 100 may be similar to that described above with respect to gripping sub assembly 120. In particular, it is noted that ridge 146 could be adapted to force the sleeve 208 towards the end cap 212 (i.e. against the bias of spring 210) in order for the gripping sub-assembly to automatically be able to eject a spent brush (i.e. once the adjustment sub-assembly has pushed the gripping sub assembly that far).

The inventors have found that the arrangement described above can result in an electrical connection between the brush and the electrolytic brush assembly that is less prone to developing hot spots and build-up of carbon over time, resulting in a more consistent electrical connection therebetween. The arrangement is also a screw less fitting, meaning that the brush does not need to be rotated in order for it to be inserted into the gripping sub-assembly 200, which can damage the filaments of the brush during insertion and necessitate that a user handle the (contaminated) spent brush during its removal.

The foregoing describes only some embodiments of the present invention, and modifications and/or changes can be made thereto without departing from the scope and spirit of the invention, the embodiments being illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that any prior art publication referred to herein does not constitute an admission that the publication forms part of the common general knowledge in the art.

The invention claimed is:

1. An electrolytic brush assembly comprising:
   a handle assembly;
   a shroud extending from the handle assembly, the shroud having an aperture at a distal end thereof;
   a brush connecting assembly for releasably connecting a brush to the handle assembly whereby the brush extends through the aperture of the shroud, the brush comprising a plurality of electrically charged filaments, and wherein the brush is fluidly connected to the handle assembly to receive fluid from the handle assembly, the fluid being deliverable to the filaments of the brush during operation;
   a sensor configured to sense one or more input conditions selected from: an amount of fumes contained in a volume defined by the shroud, electric current flowing through the brush, and electric voltage developed across the brush; and
   an electrolytic fluid delivery assembly whereby electrolytic fluid from an external source or reservoir is delivered to the proximity of the brush by a pressure source;
   wherein the electrolytic fluid delivery assembly further comprises a fluid controller configured to automatically control and vary the rate of electrolytic fluid delivery to the brush in response to the one or more input conditions sensed by the sensor.

2. An electrolytic brush assembly according to claim 1 further comprising an adjustment sub-assembly, wherein the adjustment sub-assembly comprises:
   a sheath;
   a rod slidably received within the sheath, the rod being connected to the brush connecting assembly; and
   an actuator for moving the rod within the sheath, thereby moving the brush connecting assembly and the brush connected thereto relative to the handle assembly and the aperture of the shroud.

3. An electrolytic brush assembly according to claim 2 wherein the actuator comprises rotatable sleeve having an inner thread functionally connected to the rod, whereby rotation of the rotatable sleeve causes linear movement of the rod within the sheath, thereby moving the brush connecting assembly and the brush connected thereto relative to the handle assembly and the aperture of the shroud.

4. An electrolytic brush assembly according to claim 1 wherein the brush is releasably connectable to the brush connecting assembly by a quick release mechanism comprising a female quick-connect coupler for receiving an end of the brush, the female quick-connect coupler comprising an outer sleeve slidable relative to an inner body, the outer sleeve being biased in a direction in which the brush is gripped within the female quick-connect coupler, the female quick-connect coupler releasing the brush when the outer sleeve is urged in an opposite direction.

5. An electrolytic brush assembly according to claim 4 wherein the shroud comprises an obstruction, the obstruction being arranged to contact the outer sleeve of the female quick-connect coupler upon the brush connecting assembly being moving towards the aperture of the Shroud thereby urging the outer sleeve in the opposite direction and releasing the brush from the female quick-connect coupler.

6. An electrolytic brush assembly according to claim 1 wherein the handle assembly further comprises a pistol grip handle.

7. An electrolytic brush assembly according to claim 1 wherein a volume defined by the shroud is fluidly connected to conduits in the handle assembly, wherein the conduits are fluidly connectable to an external extraction pump, thereby allowing fumes created within the volume to be extracted during operation.

8. An electrolytic brush assembly according to claim 2 further comprising:
   at least one brush extent sensor for sensing an extent to which the brush connected to the brush connecting assembly extends through the aperture of the shroud;
   a driver for driving the actuator; and
   a controller for controlling the drive means based upon input from the at least one brush extent sensor.

9. An electrolytic brush assembly according to claim 1 wherein the controller includes an anti-siphon module connected to the fluid reservoir.

10. An electrolytic brush assembly according to claim 1 wherein the fluid controller varies the floss of electrolytic fluid to maintain constant a flow based on the value of one or more input conditions.

11. An electrolytic brush assembly according to claim 1 wherein a direction of pressure applied by the pressure source reversed upon switching off the assembly.

12. An electrolytic brush assembly according to claim 1 wherein, in response to the electrolytic fluid delivery assembly being switched on, the pressure source pressurises the electrolytic fluid delivery assembly for a finite period.

13. The electrolytic brush, assembly according to claim 1 wherein the fluid controller varies the flow of electrolytic fluid in a manner that seeks to maintain constant a flow based on the value of one or more input conditions.

14. An electrolytic brush assembly comprising:
   a handle assembly;
   a shroud extending from the handle assembly, the shroud having an aperture at a distal end thereof; and
   a brush releasably connected to the handle assembly and extending through the aperture of the shroud, the brush comprising a plurality of electrically charged filaments, and wherein the brush is fluidly connected to the handle assembly to receive fluid from the handle assembly, the fluid being deliverable to the filaments of the brush during operation;
   wherein the handle assembly comprises:
      an adjustment sub-assembly for selectively moving the brush relative to the handle assembly and the aperture of the shroud; and
      an electrolytic fluid delivery assembly whereby electrolytic fluid from an external source is delivered via a conduit to the proximity of the brush by a pressure source;
   further wherein the electrolytic fluid delivery assembly further comprises a fluid controller whereby the volume flow of electrolytic fluid is varied automatically by the fluid controller in response to one or more measured input conditions selected from an amount of fumes contained in a volume defined by the shroud, electric current flowing through the brush, and electric voltage developed across the brush.

15. The electrolytic brush assembly of claim 14, wherein the adjustment sub-assembly comprises:
   a sheath;
   a rod slidably received within the sheath and in mechanical communication with the brush; and
   an actuator for moving the rod within the sheath, thereby moving the brush relative to the handle assembly and the aperture of the shroud.

16. The electrolytic brush assembly according to claim 15, wherein the actuator comprises a rotatable sleeve having an inner thread functionally connected to the rod, whereby rotation of the rotatable Sleeve causes linear movement of the rod within the sheath, thereby moving the brush relative to the handle assembly and the aperture of the shroud.

17. The electrolytic brush assembly according to claim 14, wherein the brush is releasably connectable to the handle assembly by a quick release mechanism comprising a female quick-connect coupler for receiving an end of the brush, the female quick-connect coupler comprising an outer sleeve slidable relative to an inner body, the outer sleeve being biased in a direction in which the brush is gripped within the female quick-connect coupler, the female quick-connect coupler releasing the brush when the outer sleeve is urged in an opposite direction.

18. An electrolytic brush assembly according to claim 14, further comprising at least one sensor to measure input conditions.

19. The electrolytic brush assembly according to claim 14, wherein a direction of pressure applied by the pressure source is reversed upon switching off the assembly.

20. The electrolytic brush assembly according to claim 14 wherein, in response to the electrolytic fluid delivery assembly being switched on, the pressure source pressurises the electrolytic fluid delivery assembly for a finite period.

21. An electrolytic brush assembly comprising:
   a. a pistol grip handle assembly having a plurality of conduits;
   b. a shroud extending from the handle assembly, the shroud having an aperture at a distal end thereof;
   c. a brush connecting assembly for releasably connecting a brush to the handle assembly whereby the brush extends through the aperture of the shroud; the brush comprising a plurality of electrically charged filaments, and wherein the brush is fluidly connected to the handle assembly to receive fluid from the handle assembly, the fluid being deliverable to the filaments of the brush during operation;
   d. a sensor configured to sense one or more input conditions selected from: an amount of fumes contained in a volume defined by the shroud, and electric current flowing through the brush, electric voltage developed across the brush;
   e. an electrolytic fluid delivery assembly whereby electrolytic fluid from an external source or reservoir is delivered to the proximity of the brush by a pressure source, the electrolytic fluid delivery assembly further comprising a fluid controller configured to automatically control and vary the rate of electrolytic fluid delivery to the brush in response to the amount of fumes contained in a volume defined by the shroud, the electric current flowing through the brush, or the electric voltage developed across the brush sensed by the sensor;
   f. an adjustment sub-assembly, wherein the adjustment sub-assembly comprises:
      (i) a sheath;
      (ii.) a rod slidably received within the sheath, the rod being connected to the brush connecting assembly; and
      (iii.) an actuator for moving the rod within the sheath, thereby moving the brush connecting assembly and the brush connected thereto relative to the handle assembly and the aperture of the shroud, the actuator having a driver for driving the actuator, a controller for controlling the driver and including an antisiphon module connected to the fluid reservoir, and a rotatable sleeve having an inner thread functionally connected to the rod, whereby rotation of the rotatable sleeve causes linear movement of the rod within the sheath, thereby moving the brush connecting assembly and the brush connected thereto relative to the handle assembly and the aperture of the shroud;
   g. at least one brush extent sensor for sensing an extent to which the brush connected to the brush connecting assembly extends through the aperture of the shroud, the controller controlling the driver based upon input from the at least one brush extent sensor; and
   h. wherein:
      (i.) the brush is releasably connectable to the brush connecting assembly by a quick release mechanism comprising a female quick-connect coupler for receiving an end of the brush, the female quick-connect coupler comprising an outer sleeve slidable relative to an inner body, the outer sleeve being biased in a direction in which the brush is gripped within the female quick-connect coupler, the female quick-connect coupler releasing the brush when the outer sleeve is urged in art opposite direction,
      (ii.) the shroud comprises an obstruction, the obstruction being arranged to contact the outer sleeve of the female quick-connect coupler upon the brush connecting assembly being moved towards the aperture of the shroud thereby urging the outer sleeve in the opposite direction and releasing the brush from the female quick-connect coupler,
      (iii.) a volume defined by the shroud is fluidly connected to the conduits in the handle assembly, wherein the conduits are fluidly connectable to an external extraction pump, thereby allowing fumes created within the volume to be extracted during operation,
      (iv.) in response to the electrolytic fluid delivery assembly being switched on, the pressure source pressurises the electrolytic fluid delivery assembly for a finite period,
      (v.) the fluid controller varies the flow of electrolytic fluid to maintain constant a calculation based on the value of one or more input conditions, and
      (vi.) a direction of pressure applied by the pressure source is reversed upon switching off the assembly.

* * * * *